Nov. 19, 1968    S. F. DUNCAN ET AL    3,411,273
ELIMINATOR TYPE AIR FILTER
Filed Sept. 8, 1964    3 Sheets-Sheet 1
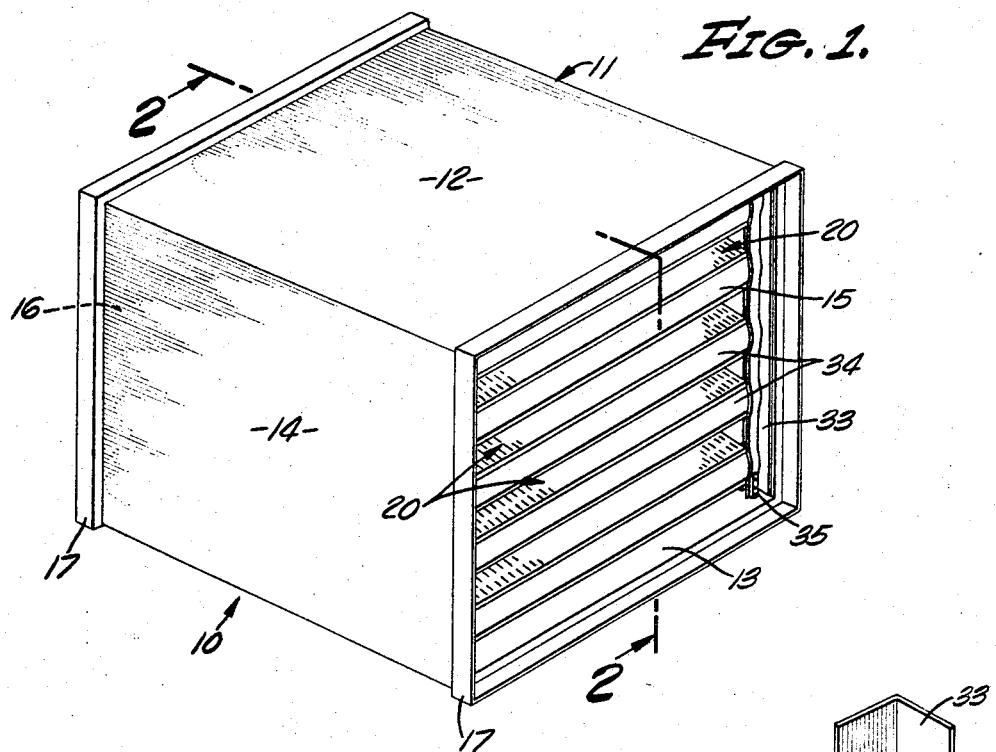
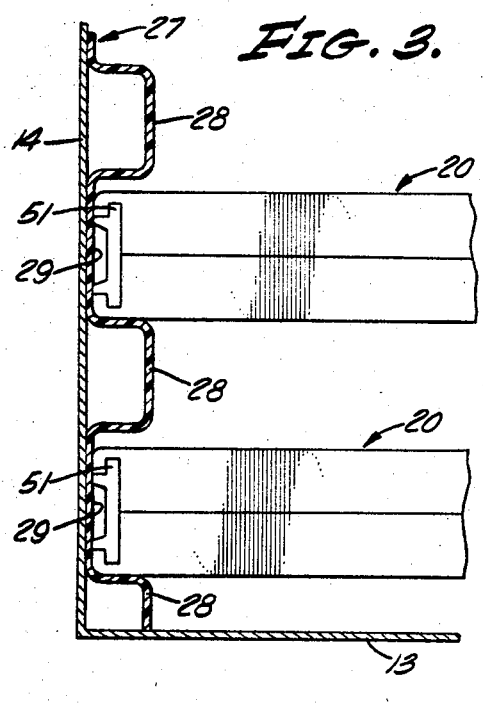
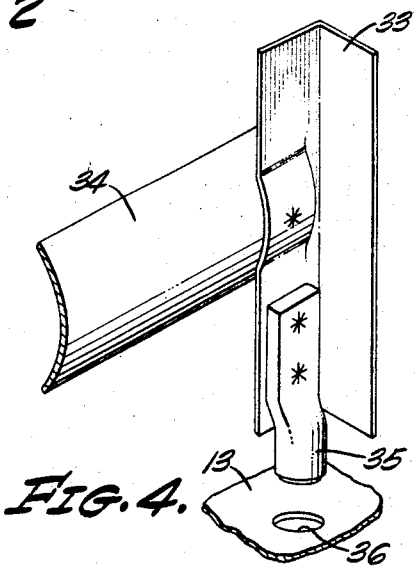
SYDNEY F. DUNCAN, DECEASED
BY ELOISE E. DUNCAN, EXECUTRIX
CLYDE O. BOOTHE
       INVENTORS.
BY *Lyon & Lyon*
       ATTORNEYS

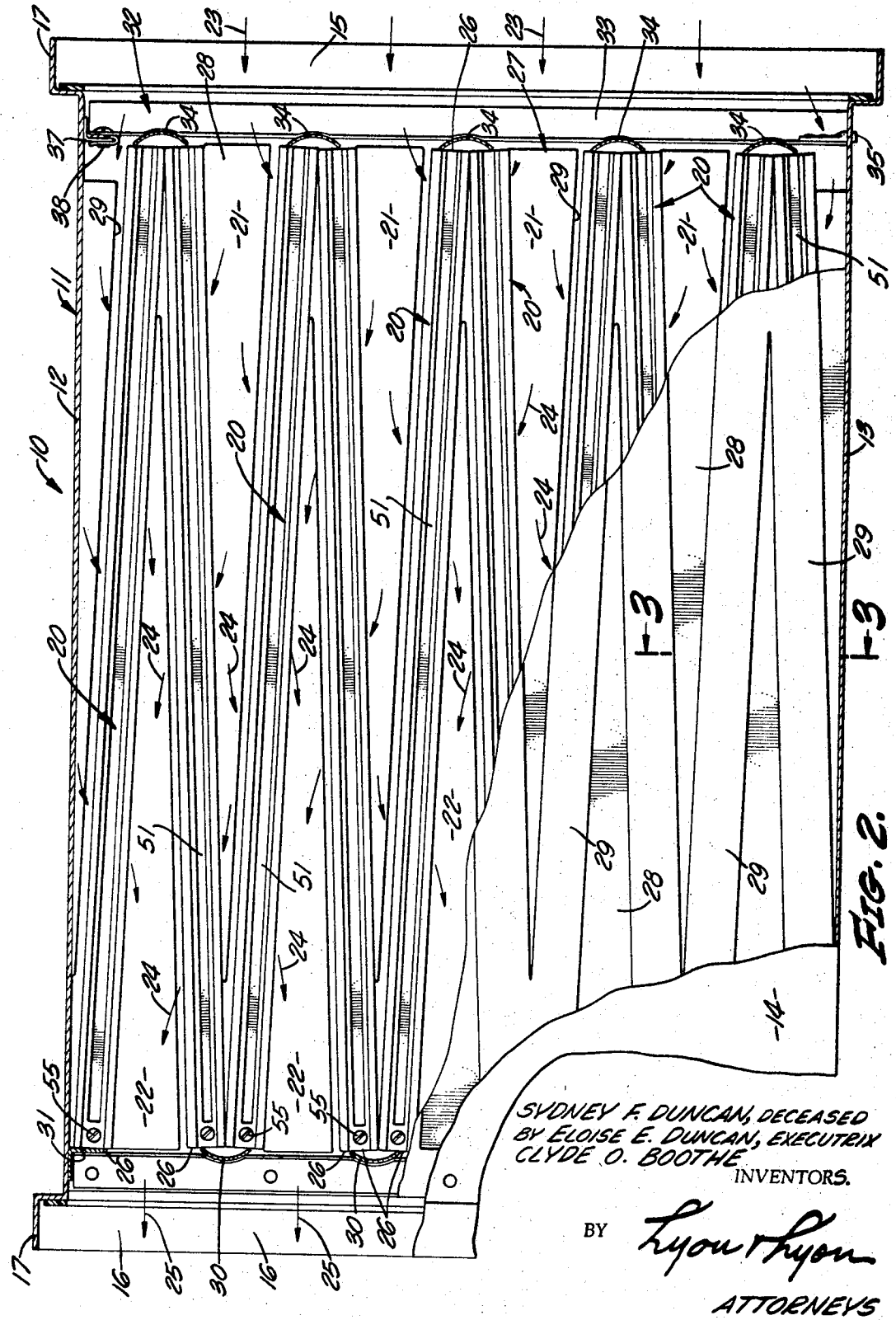

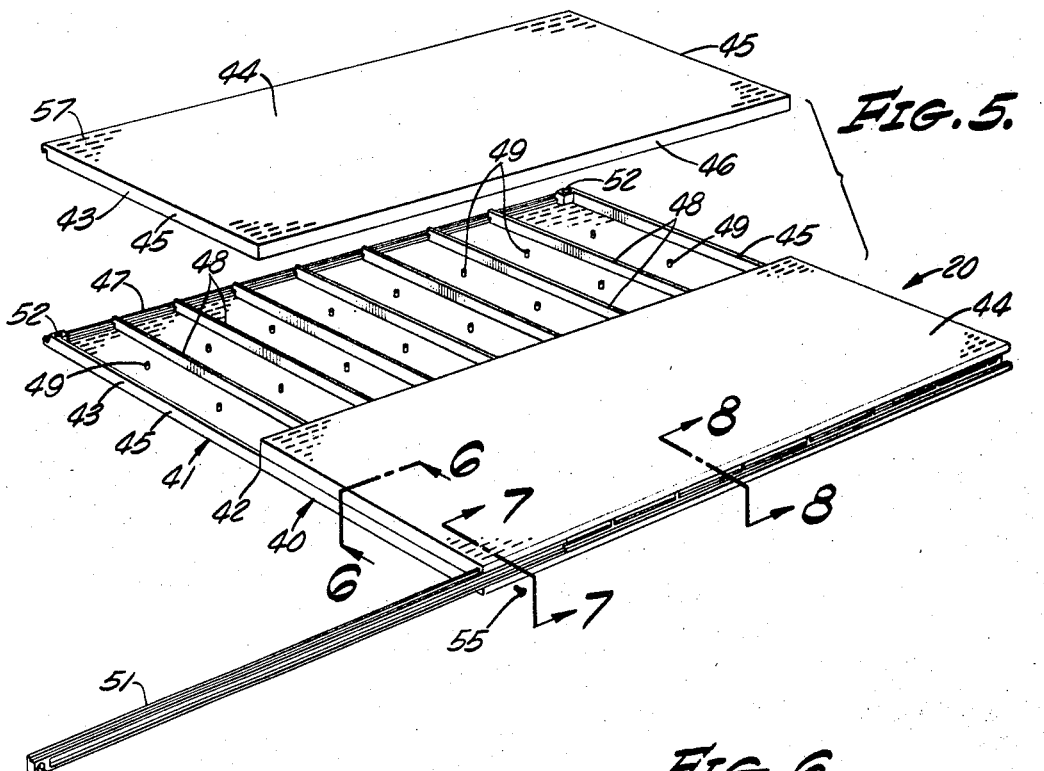
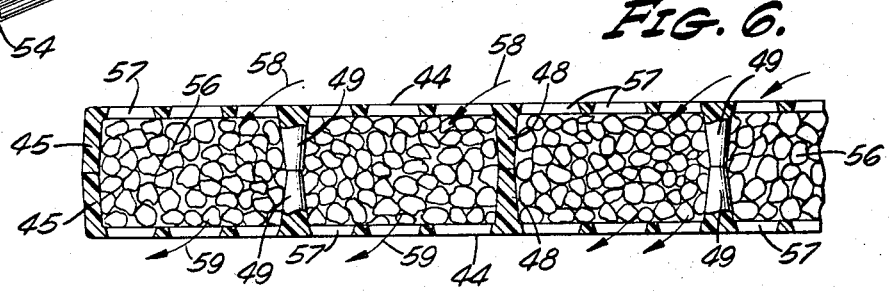
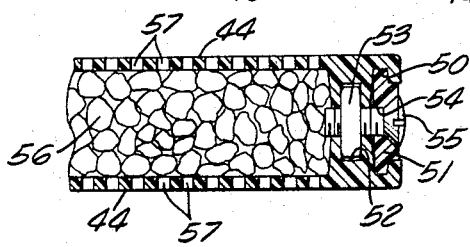
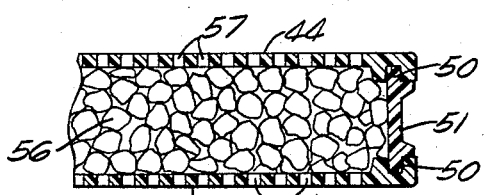
SYDNEY F. DUNCAN, DECEASED
BY ELOISE E. DUNCAN, EXECUTRIX
CLYDE O. BOOTHE
INVENTORS.
BY Lyon & Lyon
ATTORNEYS United States Patent Office — 3,411,273 — Patented Nov. 19, 1968

3,411,273
ELIMINATOR TYPE AIR FILTER
Sydney F. Duncan, deceased, late of Torrance, Calif., by Eloise E. Duncan, executrix, Torrance, Calif., and Clyde O. Boothe, Hermosa Beach, Calif., assignors to Farr Company, El Segundo, Calif., a corporation of California
Filed Sept. 8, 1964, Ser. No. 395,099
2 Claims. (Cl. 55—387)

ABSTRACT OF THE DISCLOSURE

An air filtering apparatus of the type employing a granular adsorbing material such as activated charcoal. A plurality of individual flat cells or panels containing such material and mounted in a housing in a manner for causing the air to flow through the cells with the air flow being confined to a direction along the surface of each cell and through elongated slots in the surface extending in the direction of airflow.

---

This invention relates to air filters that employ activated carbon or charcoal as the filtering media and, in particular, is directed to such a filter wherein a plurality of cells contain the activated carbon or charcoal and are individually removable for replacement or sample testing.

Many conventional air conditioning systems for large buildings or for supplying conditioned air to be used in a specific process requiring relatively clean air employ filtering units wherein the air is passed through activated carbon or charcoal. Activated carbon or charcoal has the well-known characteristic of adsorbing various foreign materials which need not be in the form of particles but rather the activated carbon or charcoal is more usually directed to adsorbing obnoxious or odoriferous gases which may be undesirable for the particular intended use of the air. The activated carbon or charcoal is generally in the granular form to expose the largest practical surface areas of the activated carbon or charcoal. This ability for activated carbon or charcoal to adsorb these undesirable gases and materials diminishes with continued use. The degree to which the effectiveness of the activated carbon or charcoal has been diminished, is not immediately apparent by mere observation of the carbon or charcoal. Thus, for an activated carbon filter to be maintained effective, the carbon must be occasionally reactivated or replaced by new activated carbon or charcoal. The frequency of this required replacement or reactivation will obviously depend on the degree of contamination of the supply air and the quantity of air that has passed over that activated carbon. Since the degree of contamination is not immediately apparent by mere observation, it is relatively conventional to provide a small test cell or indicator in the air stream for intermittent evaluation of the operational efficiency of the activated carbon or charcoal. However, such cells or indicators are a rather inaccurate indication of whether or not the carbon or charcoal needs replacement or reactivation since the test cell or indicator is not subjected to exactly the same airflow as the main body of the filter. Thus, safety and conservatism have usually dictated replacement or reactivation of the carbon or charcoal long before such is actually necessary.

As is well known, the activation or reactivation of a carbon or charcoal is accomplished by heating in a controlled atmosphere and, therefore, in order to reactivate used carbon or charcoal it is necessary that the carbon or charcoal be removed from the filter housing. Since the activated charcoal is relatively heavy, the conventional structures or housings for containing the charcoal must be rather strong and, consequently, heavy. Prior art devices have employed a screened or grid type double steel wall corrugated across the air flow inlet to expose the maximum surface area for the particular inlet opening size, with the carbon or charcoal contained between the double walls. For installation or replacement, the entire housing must be lifted into or out of position which is relatively difficult due to the substantial weight of the combined housing and carbon. As installed, the double grid walls of the prior art devices are positioned vertically whereby the carbon is compacted by virtue of its own weight to insure intimate contact with all of the air passing through the walls.

It is a principal object of this invention to provide a novel form of activated carbon or charcoal type filter wherein individual light-weight cells containing activated carbon or charcoal are removably mounted in stacked and spaced relation in the filter housing.

Another object of this invention is to provide a novel form of flat cell having hollow compartments for receiving activated carbon or charcoal wherein one edge of the cell may be opened for selectively removing and replacing the carbon or charcoal from one or more of the compartments. Still another object of this invention is to provide such a cell which by reason of its construction may be conveniently factory preloaded with activated carbon or charcoal to simplify installation and replacement. Still a further object of this invention is to provide such a cell which is of a construction for economically permitting disposal of the entire cell when reactivation of the carbon or charcoal is impractical or uneconomical.

A further object of this invention is to provide an eliminator type air filtering assembly having individually removable and replaceable flat cells containing activated carbon or charcoal, wherein the cells are positioned in a stacked relationship with space between adjacent cells for permitting the passage of air into such space and thence through a cell and, wherein, the cell walls have elongated apertures oriented in the direction of airflow for accommodating the passage of air through the cell with a minimum of turbulence and resistance.

Other and more detailed objects and advantages of this invention will appear from the following description and the accompanying drawings, wherein:

FIGURE 1 is a perspective view of an assembled filter unit of this invention.

FIGURE 2 is a sectional elevation view of the assembled filter unit taken substantially on the line 2—2 in FIGURE 1 and illustrating the direction of airflow.

FIGURE 3 is a fragmentary sectional elevation view of the side support of the assembled filter unit.

FIGURE 4 is a fragmentary perspective view of the latch arrangement for assemblying the filter unit of FIGURE 1.

FIGURE 5 is an exploded perspective view of one of the individual eliminator cells of this invention.

FIGURE 6 is a fragmentary sectional view taken substantially on the line 6—6 in FIGURE 5.

FIGURE 7 is a fragmentary sectional view taken substantially on the line 7—7 in FIGURE 5.

FIGURE 8 is a fragmentary sectional elevation similar to FIGURE 7 and taken substantially on the line 8—8 shown in FIGURE 5.

Referring now more particularly to FIGURES 1 through 4, the assembled filter unit, generally designated 10, of this invention may be of any desired shape for conveniently mounting in the appropriate location in the air handling or conditioning system employing this eliminator type filter. The unit 10 includes a generally rectangular housing 11 having a top 12, bottom 13 and a pair of side walls 14, whereby an open inlet 15 and an open outlet 16 are formed on either longitudinal end of the housing. The inlet 15 and outlet 16 may be encircled by frames 17 of a convenient shape for mounting in the particular air system, either alone or in combination with other filter units 10 to form a larger cross-sectional airflow area.

Means are provided in the filter unit 10 for accomplishing the absorption or elimination type filtering of the flowing air and, as shown in the drawings, these means may include a plurality of individual flat eliminator type filtering cells, generally designated 20, mounted in a manner for requiring all of the air flowing from inlet 15 to outlet 16 to pass through one of such cells. Specifically, the cells 20 are mounted in a zig-zag stacked relationship, as shown in FIGURE 2, wherein adjacent pairs of angularly positioned cells 20 form converging inlet passageways 21 between the cells and diverging outlet passageways 22 between the adjacent pairs of cells 20. By this arrangement, the air entering in the longitudinal direction of arrows 23 through inlet 15 flows along passageways 21 in the direction of decreasing cross-sectional flow area to cause the air to flow through the cells 20 into the passageways 22, all as shown by the various arrows 24, and out through outlet 16 in the longitudinal direction of arrows 25. The longitudinal ends 26 of immediately adjacent cells 20 are sealed together, in a manner hereafter described, to assure that all of the air passing from inlet 15 to outlet 16 must pass through one of the cells 20 rather than being permitted to bypass between a pair of cells.

The cells 20 are removably supported in this zig-zag stacked relationship in housing 11 by a pair of matched guide walls, generally designated 27, mounted on the interior of each of the side walls 14. Due to their configuration, the guide walls 27 are preferably of a moldable material such as a polystyrene plastic. The guide walls 27 include generally triangularly-shaped protruding portions 28 extending longitudinally and alternately oriented in the vertical direction along the wall for forming inclined grooves 29 between the protruding portions 28 for in turn receiving the cells 20. The aggregate of the grooves 29 form the zig-zag stacked pattern for producing the aforedescribed spacial relationship of the cells 20. The grooves 29 are open on at least one end such as the inlet end of the housing 11. At the other or outlet end, a plurality of arcuate closures 30 extend across the outlet 16 at the level of the juncture of each pair of joining grooves 29 for engaging the two longitudinal ends 26 of the two immediately adjacent cells 20 for forming a seal between those two cells. The seal formed by each closure 30 is virtually the apex of the converging passageway 21. Lateral closures 31 may also be provided at the top and bottom of the housing for sealing the ends 26 of the uppermost and lowermost cells 20 with the top 12 and bottom 13, respectively.

A composite removable closure assembly, generally designated 32, is provided as the inlet 15 for sealing immediately adjacent cell ends 26 in the installed condition. Assembly 32 includes a pair of vertical side rails 33 with a plurality of end closures 34 extending therebetween and connected thereto. The end closures 34 are adapted to engage each of the immediately adjacent pairs of ends 26 of the cells 20 for forming a seal therebetween to prevent air bypass between such cells directly into the outlet diverging passageways 22 without passing through a cell 20. The lower end of each side rail 33 is provided with a stud 35 for mating with an aperture 36 in the bottom 13 of the housing. The upper end of each of rails 33 is releasably secured to a bracket 37 by a screw 38. Thus, by releasing screws 38, the closure assembly 32 may be tilted forward and lifted out of the apertures 36 for complete removal. The individual cells 20 may then be removed by separately sliding each cell forward in the grooves 29. Reassembly of the filter unit 10 is accomplished by a mere reversal of the foregoing steps.

Referring now more particularly to FIGURES 5 through 8, each of the eliminator type filter cells 20 is an independent integral unit which is particularly, though not exclusively, suited for use in a filter unit with multiple cells positioned in zig-zag stacked relationship as heretofore described. In the particular illustrated embodiment of the filter unit 10, the cell 20 is of a material and such a size as to be more practically constructed of two separate and identical portions 40 and 41 and then joined along mutual longitudinal edges at 42. With a filter unit having a narrower housing 11, the cell 20 may be comprised of just a single portion 40 or 41. Each cell portion 40 or 41 is comprised of a pair of flat panels 43 which may be identical or of mating configuration for joining to form a hollow cell. Each panel 43 includes a perforate wall 44, imperforate lateral edge walls 45, an imperforate longitudinal edge wall 46 and an open longitudinal edge 47. The interior of panels 43 are provided with a plurality of spaced lateral partition walls 48 extending between the open edge 47 and the imperforate edge 46. Where desired or necessary, due to the spacing between partition walls 48, internal support posts 49 may be provided at appropriate locations on the interior of perforate wall 44 for mutual support of the perforate walls 44 of the two joined panels 33 to form the hollow cell. For economy and ease of construction, it is preferred that the panels 43 be molded of a plastic material such as polystyrene with the aforedescribed edges, walls and posts integrally formed. Two panels 43 may then be bounded together by an appropriate adhesive to form a hollow cell with spaced perforate walls 44 and lateral spaced partition walls 48 forming individual compartments open at the open longitudinal edge 47. The open edge 47 of each panel 43 is provided with a longitudinal groove 50 facing the other panel 43 to form a slide way along the entire longitudinal length of the assembled panels. A closure strip 51 of a length equal to the longitudinal length of panels 43 is adapted to fit the slide way formed by grooves 50 for longitudinal insertion to cover the openings into the individual hollow compartments formed between pairs of lateral partition walls 48. One or both ends of each edge 47 is provided with a socket 52 for receiving and securing a threaded nut 53 upon assembly of the pair of panels. Strip 51 is provided with an aperture 54 for receiving a screw 55 to threadedly engage nut 53 and secure the strip 51 in the closed position covering the entire open edge 47 of the cell 20. Before installation of the closure strip 51, the lateral compartments of the cell 20 are filled with the granular activated carbon or charcoal 56 by positioning the cell on edge and filling through the open edge 47. Due to the depth of the lateral compartments, a small amount of vibration of the cell during filling with activated carbon 56 will compact the carbon to assure intimate contact with the air passing through the cell. The closure strip 51 is then installed and secured in place to prevent the escape of carbon 56 and then the cell 20 is ready for installation in the housing 11.

When it is necessary to reactivate or replace the carbon 56, the cells 20 are removed from the housing 11 in the aforedescribed manner, and the strips 51 are released and removed. The carbon may then be dumped from the cell and newly activated carbon substituted as described. For determining whether or not the activated carbon 56 has absorbed a sufficient quantity of foreign material as to be ineffective, the closure strip may be released and longitudinally moved to expose only one or two compartments and the carbon 56 dumped from such compartment. This removed carbon may then be placed in a sealed container and returned to a laboratory for appropriate testing to ascertain whether the carbon 56 needs reactivating. By this manner, therefore, a portion of the actual filtering carbon serves as a test sample of the useful life of the activated carbon. Of course, the emptied compartments are refilled with activated carbon before reinstalling the cell 20 in the filter unit 10 for preventing air bypass through such compartments during use of the filter unit while proceeding with the testing of such sample carbon.

The perforate walls 44 are provided with integrally formed apertures 57 for permitting the aforedescribed airflow through the cell 20 in intimate contact with the activated carbon 56. The apertures 57 are of a lateral width less than the granular size of the activated carbon 56 to retain the carbon between the perforate walls 44. The apertures 57 are elongated in the longitudinal direction to a length substantially greater than granular size of the activated carbon 56 and, in fact, are preferably as long as structurally possible for that particular material comprising the cell without requiring excessive lateral spacing between apertures 57. As shown in FIGURE 6 the longitudinal length of each aperture 57 is substantially greater than the thickness of the perforate wall 44. The cells 20 are positioned in the housing 11 of the filter unit 10 with elongated apertures 57 extending in the longitudinal direction from inlet 15 toward outlet 16. Thus as the air flows along the surface of the cells 20 in the converging passageways 21, the air will smoothly flow into the longitudinal slots in the direction of arrows 58 with a very minimum of abruptness in change in direction of airflow into the cell thereby minimizing the turbulence and resultant loss of airflow efficiency. Similarly, the air smoothly flows out of the cells in the longitudinal direction of the elongated slots 57 as shown by arrows 59. In contrast, conventional perforate cell walls employ round or square apertures of a size necessarily smaller than the granular carbon and therefore would cause an abrupt change in direction of airflow.

We claim:
1. An eliminator for filtering foreign material from air comprising, a pair of flat panels joined to form a flat cell, each said panel having a perforate wall spaced from said perforate wall of the other joined panel for forming a hollow cell, said panels having a plurality of spaced integral partition walls extending laterally to form separate lateral compartments, said lateral compartments all having the same one lateral end closed and the other lateral end open, said joined panels having means forming a longitudinal slideway along said open ends of said compartments, a strip slidably received in said slideway across said open ends for selectively and serially exposing or closing the open ends longitudinally along said panels, granular eliminator material filling said compartments, means for confining the air flow longitudinally along the perforate wall surface of said cell both entering and leaving said cell, and said perforate walls having a multiplicity of spaced elongated slots of a width less than and a longitudinal length substantially greater than the size of said granular material, said elongated slots oriented with their longitudinal length extending in the longitudinal direction of air flow for minimizing the abruptness of the change in direction of the air flow into and through the cell from the said longitudinal direction of air flow along the cell surface.

2. An eliminator for filtering foreign material from air, comprising, a longitudinally open housing, a plurality of flat eliminator cells removably mounted in zig-zag stacked relationship in said housing, means for sealing adjacent cells together for confining the airflow longitudinally into the space between adjacent cells in the converging direction along the surface of the cells, each said cell having a pair of flat panels joined to form the cell, each said panel having a perforate wall spaced from the said perforate wall of the other joined panel for forming a hollow cell, said panels having a plurality of spaced integral partition walls extending laterally to form separate lateral compartments, said lateral compartments all having the same one lateral end closed and the other lateral end open, said joined panels having means forming a longitudinal slideway along said open ends of said compartments, a strip slidably received in said slideway across said open ends for selectively and serially exposing or closing the open ends longitudinally along said panels, granular eliminator material filling said compartments, and said perforate walls having a multiplicity of spaced elongated slots of a width less than and a longitudinal length substantially greater than the size of said granular material, said elongated slots oriented with their longitudinal length extending in the longitudinal direction of air flow for minimizing the abruptness of the change in direction of the air flow into and through the cell from the said longitudinal direction of air flow along the cell surface.

References Cited
UNITED STATES PATENTS

| | | | |
|---|---|---|---|
| 1,521,576 | 12/1924 | Wittmeier | 55—484 X |
| 1,868,961 | 7/1932 | Ahrens | 55—388 X |
| 2,130,806 | 9/1938 | Link | 55—484 |
| 2,178,614 | 11/1939 | Slayter | 55—518 X |
| 2,575,499 | 11/1951 | Manow | 55—480 X |
| 2,764,251 | 9/1956 | Jessop | 55—316 |
| 2,789,663 | 4/1957 | Camp. | |
| 3,186,149 | 6/1965 | Ayers | 55—484 X |
| 3,243,942 | 4/1966 | Burke | 55—387 |

FOREIGN PATENTS

| | | |
|---|---|---|
| 224,404 | 2/1943 | Switzerland. |

HARRY B. THORNTON, *Primary Examiner.*